US011946314B2

(12) United States Patent
Goldense

(10) Patent No.: US 11,946,314 B2
(45) Date of Patent: Apr. 2, 2024

(54) SYSTEMS AND METHODS FOR PROVIDING DOOR CLEARANCE MODIFICATION

(71) Applicant: GOLDENSE OPENINGS SOLUTIONS LLC, Medfield, MA (US)

(72) Inventor: Paul M. Goldense, Medfield, MA (US)

(73) Assignee: GOLDENSE OPENINGS SOLUTIONS LLC, Medfield, MA (US)

( * ) Notice: Subject to any disclaimer, the term of this patent is extended or adjusted under 35 U.S.C. 154(b) by 0 days.

(21) Appl. No.: 17/389,799

(22) Filed: Jul. 30, 2021

(65) Prior Publication Data

US 2021/0355748 A1 Nov. 18, 2021

Related U.S. Application Data

(63) Continuation of application No. 16/446,061, filed on Jun. 19, 2019, now Pat. No. 11,118,394.

(60) Provisional application No. 62/765,296, filed on Aug. 20, 2018, provisional application No. 62/688,783, filed on Jun. 22, 2018.

(51) Int. Cl.
*E04C 2/00* (2006.01)
*E06B 5/16* (2006.01)

(52) U.S. Cl.
CPC .................................... *E06B 5/164* (2013.01)

(58) Field of Classification Search
CPC ....................................................... E06B 5/164
See application file for complete search history.

(56) References Cited

U.S. PATENT DOCUMENTS

| | | | | |
|---|---|---|---|---|
| 3,566,541 A | 3/1971 | Coulter | | |
| 3,964,214 A | 6/1976 | Wendt | | |
| 4,663,204 A | 5/1987 | Langham | | |
| 6,115,976 A | 9/2000 | Gomez | | |
| 6,170,210 B1 | 1/2001 | Marts | | |
| 6,643,991 B1 | 11/2003 | Moyes | | |
| 7,059,092 B2 * | 6/2006 | Harkins | E06B 5/164 | 52/232 |
| 7,575,195 B2 * | 8/2009 | Eveker | B64C 1/1423 | 244/129.5 |
| 7,886,501 B2 * | 2/2011 | Bartlett | E06B 3/88 | 52/800.1 |
| 8,225,553 B1 * | 7/2012 | Redfern | E06B 5/164 | 49/477.1 |
| 9,109,388 B2 | 8/2015 | Tyler et al. | | |
| 9,151,106 B2 | 10/2015 | Noble, III | | |

(Continued)

FOREIGN PATENT DOCUMENTS

| | | |
|---|---|---|
| CA | 2846726 A1 | 9/2014 |
| CA | 2939255 A1 | 2/2017 |

OTHER PUBLICATIONS

Examiner's Report issued by the Innovation, Science and Economic Development Canada (Canadian Intellectual Property Office) in related Canadian Patent Application No. 3,047,475 dated Jul. 17, 2020, 3 pages.

*Primary Examiner* — Basil S Katcheves
(74) *Attorney, Agent, or Firm* — Gesmer Updegrove LLP

(57) ABSTRACT

A tire door clearance system is disclosed that includes a non-flammable material that is fastened at a first portion thereof on an inner side thereof to any of a door and door frame, and an intumescent material applied to the inner side of the non-flammable material at a second portion thereof.

18 Claims, 16 Drawing Sheets

(56) References Cited

U.S. PATENT DOCUMENTS

| | | | | |
|---|---|---|---|---|
| 9,273,510 | B2 | 3/2016 | Pardoe | |
| 9,518,422 | B2 | 12/2016 | Noble, III | |
| 9,909,356 | B1 * | 3/2018 | O'Keeffe | E06B 5/162 |
| 2003/0024184 | A1 * | 2/2003 | Orr, Jr. | E06B 5/164 52/211 |
| 2003/0167709 | A1 | 9/2003 | Harkins et al. | |
| 2005/0268559 | A1 * | 12/2005 | Ellingson | E06B 7/2314 49/475.1 |
| 2006/0048466 | A1 * | 3/2006 | Darnell | E06B 1/60 52/204.1 |
| 2006/0248833 | A1 * | 11/2006 | Autovino | E06B 5/16 52/784.1 |
| 2006/0272247 | A1 * | 12/2006 | Bartlett | E06B 3/88 52/232 |
| 2009/0282760 | A1 * | 11/2009 | Sampson | E04F 15/02423 52/794.1 |
| 2011/0036509 | A1 * | 2/2011 | Goodman | E06B 5/164 160/1 |
| 2015/0033646 | A1 * | 2/2015 | Baumert | E04B 1/94 52/309.4 |
| 2021/0032927 | A1 * | 2/2021 | Brown | E04B 1/948 |
| 2021/0388670 | A1 * | 12/2021 | Lim | E06B 5/164 |

* cited by examiner

*Intuswell AST Alternate #1 or #2 Design using adhesive application at a pair of door edges.*

*The edges are free to move horizontally to close the gap.*

SYSTEMS AND METHODS FOR PROVIDING DOOR CLEARANCE MODIFICATION

PRIORITY

The present application is a continuation of U.S. patent application Ser. No. 16/446,061, filed Jun. 19, 2019, which claims priority to each of U.S. Provisional Patent Application Ser. No. 62/688,783 filed Jun. 22, 2018 and U.S. Provisional Patent Application Ser. No. 62/765,296 filed Aug. 20, 2018, the disclosures of all of which are hereby incorporated by reference in their entireties.

BACKGROUND

The present invention generally relates to door fabrication and door clearance corrections and remediation, and relates in particular to door clearance modification for fire safety purposes.

While many doors for use in commercial properties are manufactured to comply with a wide range of fire and safety regulations, the mounting of the doors within door frames sometimes introduces a variety of variables that may actually render the door (in the door frame) to be non-compliant. Further, doors may move over time due to sagging, and door frames may be compromised by having hardware mounted to the door frame, which hardware is later removed, leaving holes in the door frame through which fire may travel. While such fire safety doors are designed to satisfy stringent fire safety codes, many, in time, fall out of compliance while mounted in door frames.

There is a need for improved door and door frame systems that provide that the door and door frame system remain compliant under fire safety codes for extended periods of time.

SUMMARY

In accordance with an embodiment, the invention provides a fire door clearance system including a non-flammable material that is fastened at a first portion thereof on an inner side thereof to any of a door and door frame, and an intumescent material applied to the inner side of the non-flammable material at a second portion thereof.

In accordance with another embodiment, the invention provides a fire door system comprising an intumescent material sandwiched between a non-flammable material and any of a door and door frame.

In accordance with a further embodiment, the invention provides a method of providing clearance of a fire door system, said method comprising the steps of providing an intumescent material on an intumescent portion of a first side of a non-flammable material, fastening the non-flammable material to a door or a door frame at a first portion of the non-flammable material such that the first side of the non-flammable material contacts the door or door frame, and permitting a second portion of the non-flammable material to move away from the door or door frame in event that the intumescent material expands.

BRIEF DESCRIPTION OF THE DRAWINGS

The following description may be further understood with reference to the accompanying drawings in which.

Figure 1:
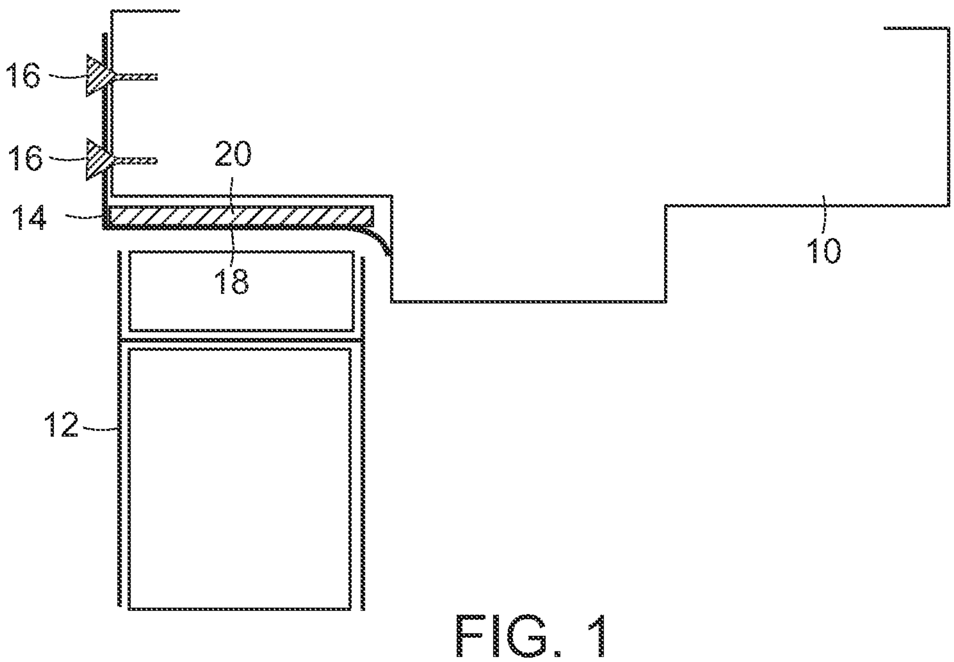
FIG. 1 shows an illustrative diagrammatic view of a door frame seal head in accordance with an embodiment of the present invention.

The drawings are shown for illustrative purposes only.

DETAILED DESCRIPTION

It is an objective of the present invention to restore lost fire ratings on single swing doors and frames in conformance with National Fire Protection Association (NFPA) 80 design criteria and hardware manufacturers testing affidavits. Fire doors, either wood or metal, when installed in hollow metal frames are designed to pass fire tests when head and jamb perimeter clearances are ⅛" or less for wood and 3/16" or less for hollow metal with a maximum ¾" bottom undercut for either, and when hardware applied to or installed in the fire door allows the door to latch to the frame with at least the minimum latch throw stipulated in the NFPA 80 Code or the manufacture's test criteria and installation instructions. This minimum latch engagement in the frame is necessary to ensure that the door remains latched when subjected to the hose stream test on fire ratings 45 minutes and above and in live fire conditions. All hardware latch projections and testing are done using the maximum allowable ⅛" door to frame clearance stipulated in the code.

Products currently available for excessive fire door clearances use a reactive design that is meant to treat the symptom rather than the cause. This means the products being produced address the flame penetration thru the door and frame assembly after the flames have already penetrated the excessive clearance between the door and frame. The products presently available control the flame by extending the door overlap depth of the frame stop by different means. Some products require wrapping the edge of wood doors in metal enclosures to stop charring or burning from flames passing by the wood door edge.

Systems of the design disclosed herein addresses two main criteria of fire door failure. First, they limit or restore the clearance between the door and the frame back to the original back into manufactures design and test criteria. Second, they restore the positive latching mechanism latch bolt to strike relationship back to the ⅛" maximum clearance design criteria. When ⅛" or less clearance is achieved latching for the hose stream test and actual live fire design requirements will be met.

Fire flames need and seek oxygen to burn or continue burning. By designing the door rabbet metal projection of systems of the invention to accept intumescent materials the door system can starve the flames of oxygen as it seals the gap between the door and the frame or the door and the door with noncombustible flexible steel.

The frame seal metal strip in accordance with an embodiment of the present invention the full depth of the door rabbet with a rolled bite edge where it meets the stop. The door rabbet metal projection is not secured to the door rabbet and free to flex against the door edge or top.

When used at a door frame head in accordance with an embodiment, it is referred to herein as a frame seal head (FSH) and when used at a door jamb it is referred to herein as a frame seal jamb (FSJ). In accordance with various embodiments, such intumescent material may be used at all openings along the door frame and/or door.

Figure 2:
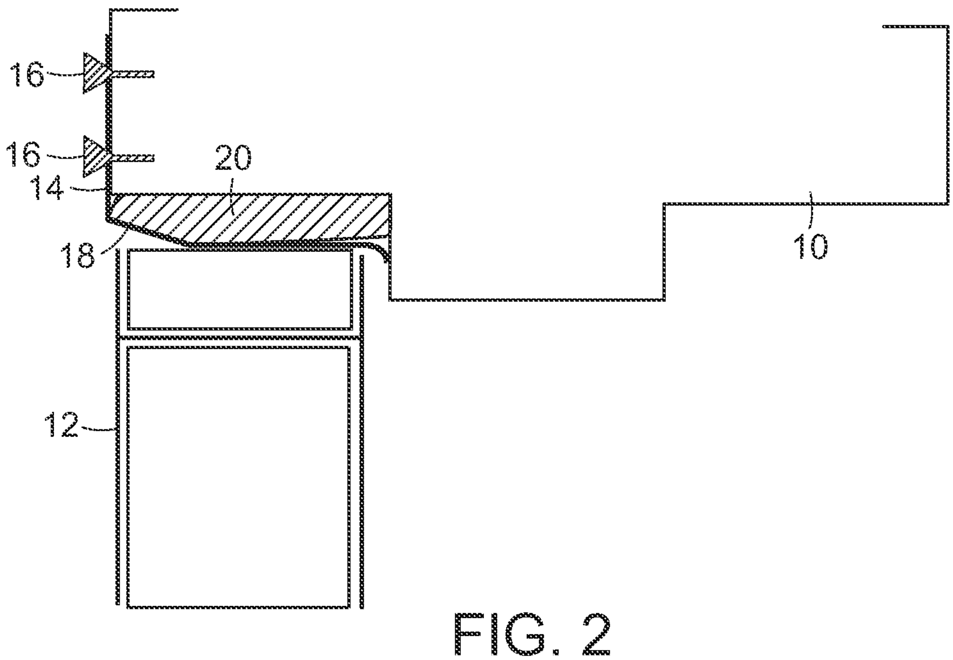
FIG. 2 shows an illustrative diagrammatic view of the door frame seal hear of FIG. 1 in a post fire/flame state.

FIG. 1, for example, shows a side view of a door frame head 10 as well as a side view of a door 12 that is closed in the door frame (again, the door frame head is shown). In accordance with an embodiment, the system of an embodiment of the present invention includes a sheet of metal 14 that runs across the door frame head 10, and is fastened to the door frame head 10 by fasteners 16, which may for example, be any of screws, bolts or rivets. A lower section 18 of the sheet of metal 14 extends under the door frame head 10 above the door 12. The upper side of the section 18 includes thereon an intumescent material 20. The intumescent material 20 may, for example, be a graphite or sodium silicate based material that swells and expands when exposed to high heat and/or flames. While intumescent material is known to be used in connection with fireproofing, such uses have involved providing finishes on exposed steel structures, and as a stripping directly onto door frames, where such strips may be caught on other items moved through the door or may become worn. There has been no remediation system that introduces a strip of non-flammable material (e.g., a metal strip) onto which the intumescent material is applied, and wherein the intumescent material urges the strip against a door when expanded due to heat and/or fire as shown in FIG. 2.

Figure 3:
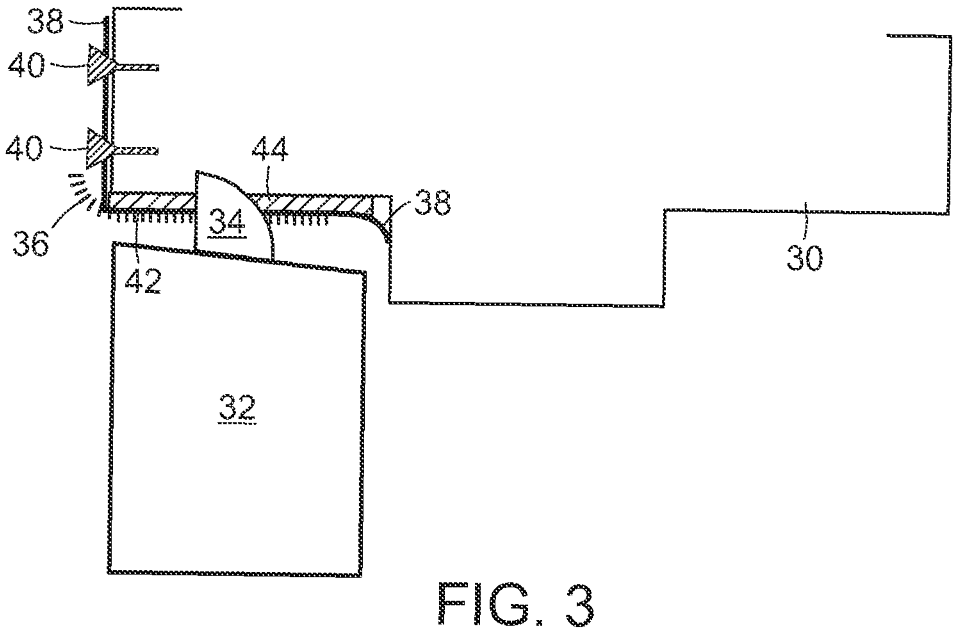
FIG. 3 shows an illustrative diagrammatic view of a frame seal jamb in accordance with another embodiment of the present invention.

FIG. 3 shows a top view of a door frame 30 and a top view of a door 32 within the door frame 30, as well as a door latch 34 (shown diagrammatically) and a latch strike plate 36 on the door frame jamb. Again, in accordance with an embodiment, the system of an embodiment of the present invention includes a sheet of metal 38 that runs along the door frame 30, and is fastened to the door frame 30 by fasteners 40, which may for example, be any of screws, bolts or rivets. An inner section 42 of the sheet of metal 38 extends inside the door frame 30 next to the door 32. The non-door facing side of the section 42 includes thereon an intumescent material 44.

Figure 4:
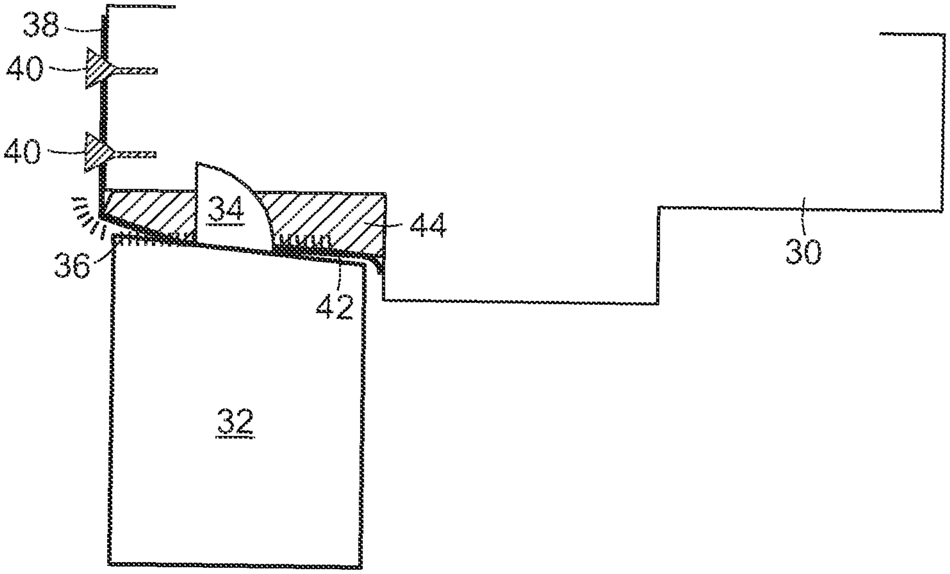
FIG. 4 shows an illustrative diagrammatic view of the frame seal jamb of FIG. 3 in a post fire/flame state.

A metal strip 38 is provided onto which an intumescent material 44 is applied, and the intumescent material urges the metal strip 38 against the door 32 when expanded due to heat and/or fire as shown in FIG. 4. While an opening in the intumescent material may be provided that allows the latch to engage the opening in the latch strike plate, such an opening in the intumescent material expands and shall maintain positive latching through the expansion process. Again, the intumescent material 44 may, for example, be a graphite based material that swells and expands when exposed to high heat and/or flames.

Figure 5:
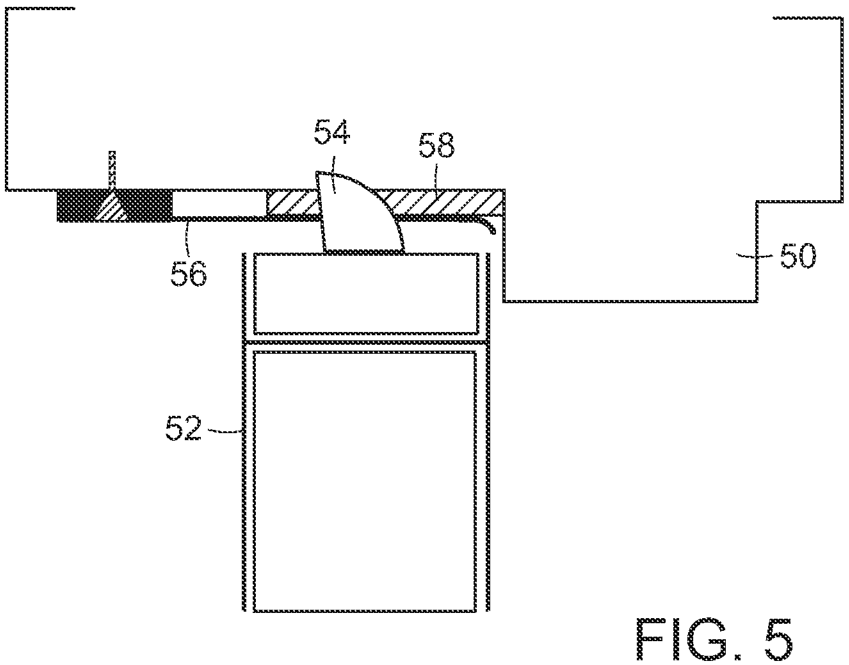
FIG. 5 shows an illustrative diagrammatic view of a frame seal in a double egress door and frame in accordance with a further embodiment of the present invention.
Figure 6:
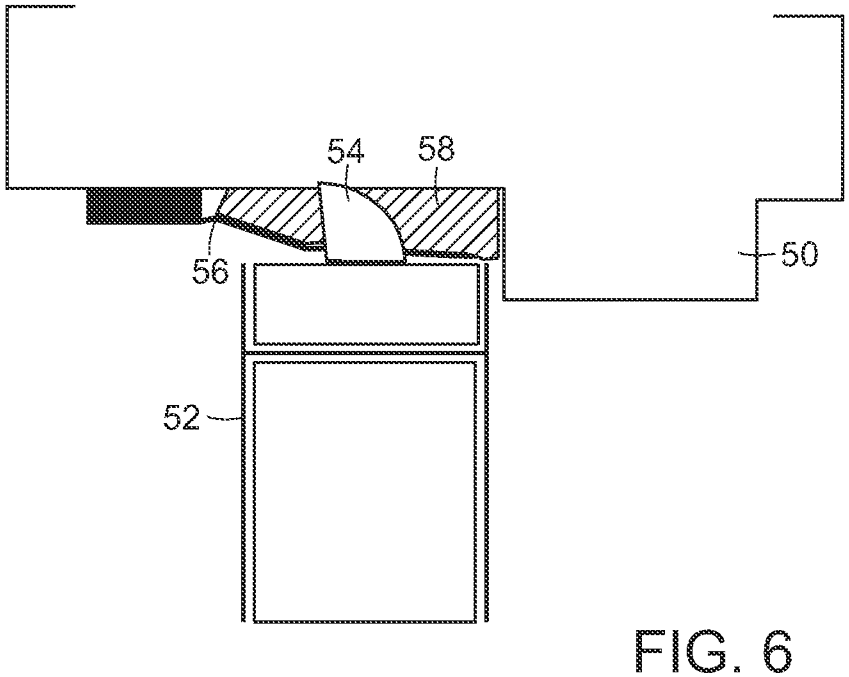
FIG. 6 shows an illustrative diagrammatic view of the frame seal in the double egress door and frame of FIG. 5 in a post fire/flame state.

With reference to FIG. 5, double egress top seal in accordance with an embodiment of the present invention uniquely seals excessive clearance between the door and frame on a double egress frame assembly, and restores the positive latching of concealed latches. Such doors with head latching mechanisms are common, for example in long, wide hallways such as in hospitals. FIG. 5, for example, shows a side view of a double egress (DE) door frame head 50, and side view of a DE door 52 within the door frame. As shown, the latchbolt 54 engages a latch recess in the head 50. A metal strip 56 is attached to the head 50 by screws, bolts or rivets etc., and an intumescent material 58 is applied to the side of the metal strip away from the door 52, and the intumescent material urges the metal strip 56 against the door 52 when expanded due to heat and/or fire as shown in FIG. 6. The intumescent material 58 may be as discussed above.

Figure 7:
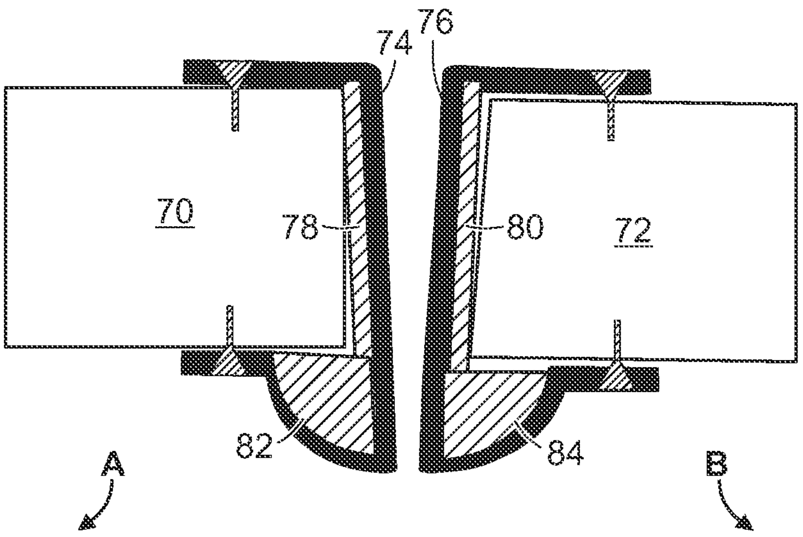
FIG. 7 shows an illustrative diagrammatic view of a sealed pair of door edges in accordance with a further embodiment of the present invention.
Figure 8:
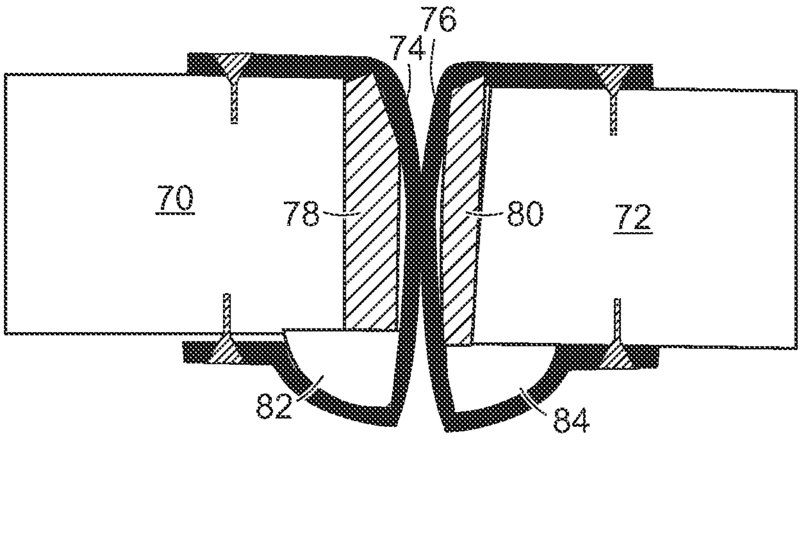
FIG. 8 shows an illustrative diagrammatic view of the sealed pair of door edges of FIG. 7 in a post fire/flame state.

In accordance with further embodiments, an astragal material (AST) may be used that is not secured to the door edges. AST is designed to allow doors that are both properly hung as well as out of wind doors to seal. This is accomplished with the two pieces of astragal materials joining together under the swelling force exerted on them by the intumescent. FIG. 7 shows an pair of astragal doors 70, 72 that open as shown at the arrows A, B. The AST door materials are wider than the standard 1¾" fire doors thus allowing the 1¾" space to be restored when doors are out of wind. A metal strip 74, 76 is attached to each of the doors 70, 72 by screws, bolts or rivets etc., wrapped around an open end of each door. An intumescent material 78, 80 is applied to the inside of the metal strips 74, 76 away from the doors 70, 72. Note that as the metal strips are fastened on each end, a relief portion 82, 84 is provided on each metal strip 74, 78 that bends and permits the intumescent material 78, 80 to swell, whereupon the intumescent material urges the metal strips 74, 76 against each other when expanded due to heat and/or fire as shown in FIG. 8. The intumescent material 78, 80 may be as discussed above.

Figure 9:
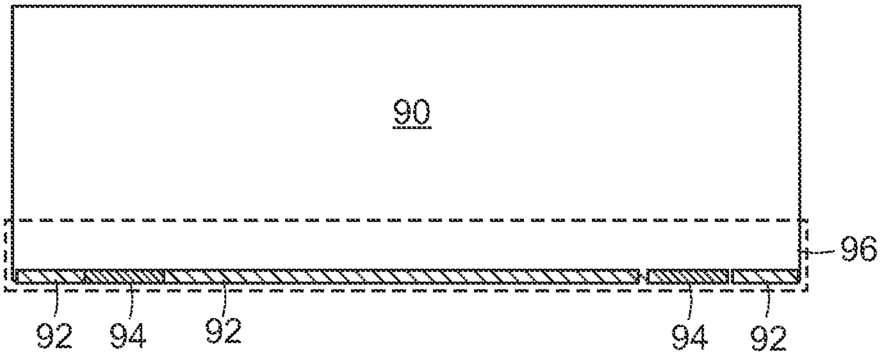
FIG. 9 shows an illustrative diagrammatic front view of a bottom of a door in accordance with an embodiment of the present invention.
Figure 10:
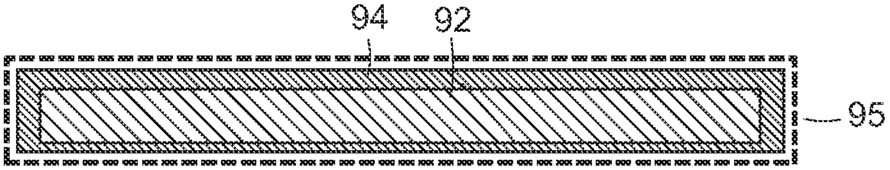
FIG. 10 shows an illustrative diagrammatic bottom view of the door of FIG. 9.
Figure 11:
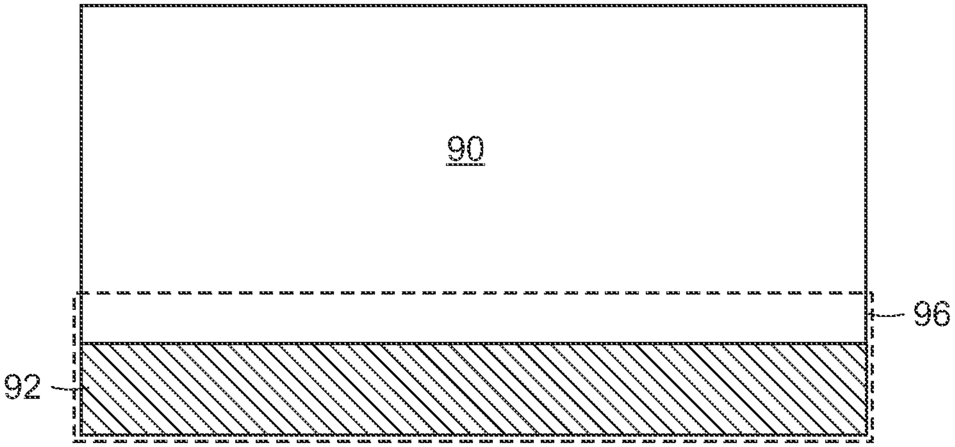
FIG. 11 shows an illustrative diagrammatic front view of the door of FIG. 9 in a post fire/flame state.

A system in accordance with further embodiments may include a door bottom (DB) that is a two piece assembly. One piece is affixed to the door and one piece is held in place under normal conditions and allowed to expand to the floor and seal the gap between the door and floor under fire conditions. For example, FIG. 9 shows a front view of a bottom of a door 90. Along the bottom of surface of the door is provided an intumescent material 92, as well as an outer adhesive 94. As further shown in a bottom view in FIG. 10 (without the metal shoe 96 shown), the adhesive material 94 surrounds the intumescent material 92. A metal strip 95 is applied to the bottom of the door 90. When the door is subjected to heat and/or fire, the intumescent material expands, breaking the seal of the adhesive as shown in FIG. 11, and is urged against the ground under the door. In normal conditions, air flow is allowed to ensure door closure. Under fire conditions, air and flames are contained.

A common design of the above embodiments is that the seal materials displace to seal gaps when the intumescent expands with heat and flame. With the FF and DE systems, the fastening is away from the door rabbet which allows the rabbet material to be free to flex against the edge or top of the door when the intumescent expands. This designed flexion against the edge or top of the door in conjunction with the rolled "bite" edge which normally rests against the stop allows the flexible steel seal to move when the intumescent backing expands. When the seal moves the gap is closed with non-combustible steel held in place by expanding intumescent. With wooden doors, when the intumescent expands, the bite edge grabs the wood or metal door edge ensuring a better seal to stop flames and oxygen penetration.

Upon the initial heat exposure the flexible system stop will seal the edge of the wood door or metal door to the frame assembly and stop flame penetration. When the flames are sealed from oxygen feeding from the opposite side, the charring and burning of wood or distortion of the metal from flames will be reduced or eliminated.

Additionally, when the system is used on a door jamb of a door frame (e.g., FIGS. 3-6), a positive latching is either maintained or possibly enhanced. The stop applied fire door clearance remediation products on the market do not restore the door latch to strike relationship as they are all applied behind the door. This necessitates additional products to be used to shim strikes into place for proper latching. The products sold to remediate excessive clearance do not include additional product to ensure positive latching in conjunction with flame mitigation. The owner/installer needs to know to purchase additional product to fix both non-compliant issues. Fixing excessive clearances without remediating positive latching at the same time does not make a door compliant. The weak link of the assembly is whichever problem is left unaddressed. In systems in accordance with various embodiments of the invention, the door edge to door latch relationship is restored at the same time as the door clearance envelope is addressed.

Traditionally, all fire rated latching hardware is designed and tested with a ⅛" maximum clearance between the edge of the door latch and its corresponding door strike. There are tested products available to shim 4⅞" ASA strikes back to the proper ⅛" clearance but there are no tested products available to shim flush bolt strikes, concealed vertical rod fire exit hardware strikes back to the proper ⅛" door to frame clearance to meet design and fire test criteria.

Systems in accordance with various embodiments may be mortised to receive the original factory strikes from the hardware manufacturers. Theses strikes will be shimmed to their proper location with supplied steel shims and secured with the manufacturer's standard approved fasteners into the original frame reinforcements thus ensuring positive latching. Double egress frames and frame heads use a centered door design. When the head clearance exceeds the allowable ⅛" systems of the invention may be used.

The system design in accordance with certain embodiments, utilizes the extended depth of the frame head on a double egress frame to allow the system to be located far enough away from the 1¾" thick door to flex and seal against the top of the door. This system head piece will be fabricated to receive the top latch of the hardware if so equipped.

Figure 12:
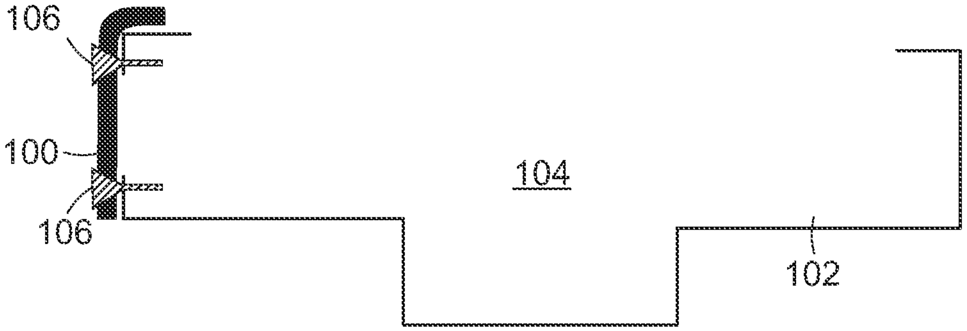
FIG. 12 shows an illustrative diagrammatic view of a frame face filler in accordance with an embodiment of the present invention.
Figure 13:
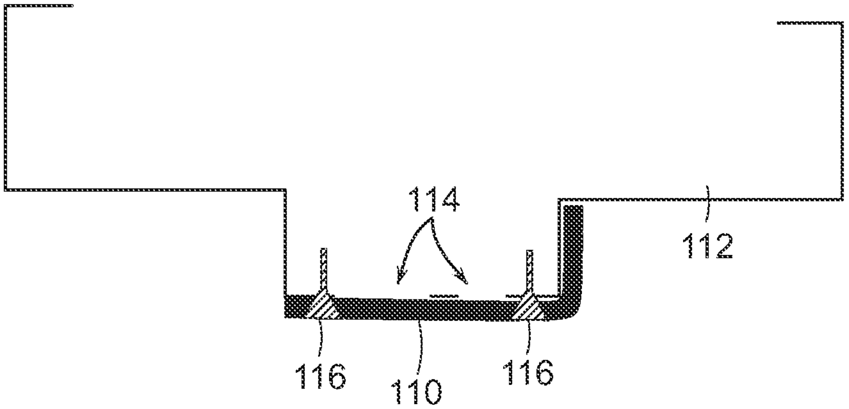
FIG. 13 shows an illustrative diagrammatic view of a stop face fill in accordance with a further embodiment of the present invention.

A further benefit of systems in accordance with various embodiments, is that the non-flammable strip material may also be used to cover openings in the door frame (or even the door). In particular and with reference to FIGS. 12 and 13, the metal strip 100, 110 may be used as a frame face filler that is deigned to restore lost fire ratings to door frames 102, 112 that have through hole penetrations 104, 114 larger than can be filled with manufacturers standard hardware fasteners. The metal strip 100, 110 is attached by fasteners 106, 116 to sound portions of the door frame 102, 112.

In such further examples, metal strips may be applied to doors in order to restore lost fire ratings to doors, and the metal strips may at the same time be used in connection with the intumescent material as discussed above. In some door installations, hardware may have at one time been mounted on the door or door frame, and later removed or replaced with other hardware mounted elsewhere on the door or door frame. Such hardware may include, for example, passive closing devices, smoke-triggered closing devices, automatic opening devices, alarm systems, cameras, scanners and additional handles etc. Once removed, holes relay remain in the door frame or door that render the system non-compliant. Further, new door frames are sometimes factory prepared or field drilled for hardware items, which either may not be mounted in the end, or have long since been removed due to code changes. Many existing door frames were prepared to accept electric conduits for fire door closers or magnetic locks. When that hardware is removed for other hardware, holes remain in the door frame.

Additionally, doors that were originally equipped with latching hardware for 90 minute fire rating have now been downgraded to 20 minute rating when sprinklers were added to the building. Removal of this hardware or changes to the hardware results in holes in the door frame or door stop that accommodated the old latching hardware with mortised stops.

Many existing frames have holes in them from field modifications due to items such as plastic non fire rated motion or presence detectors, alarm systems, door contacts. The resulting holes left after removal of these unapproved devices can be properly covered with the strip plate frame seal head and frame seal jamp fillers to restore lost fire ratings without frame removal.

In accordance with further embodiments (and with reference to FIGS. 14 and 15), systems in accordance with certain embodiments may provide increased stop depth in a door frame assembly to provide greater clearances between the door and frame, providing a retrofit seal fire rating for door and frame conditions on the hinge side where there is an excessive gap.

Figure 14:
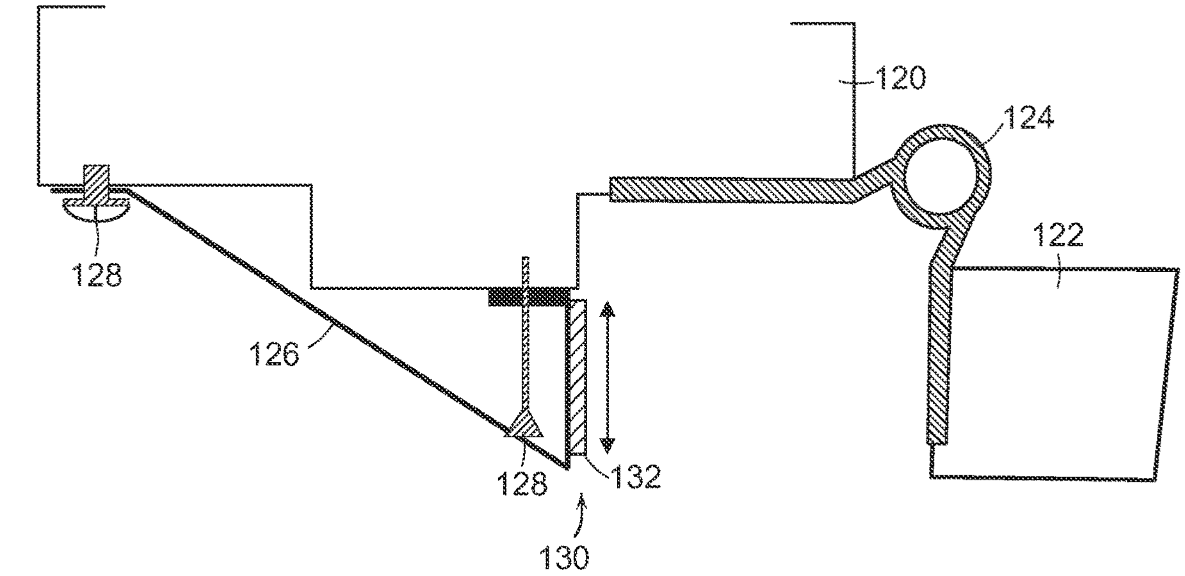
FIG. 14 shows an illustrative diagrammatic view of a door frame jamb with an edge saver in accordance with an embodiment of the present invention.
Figure 15:
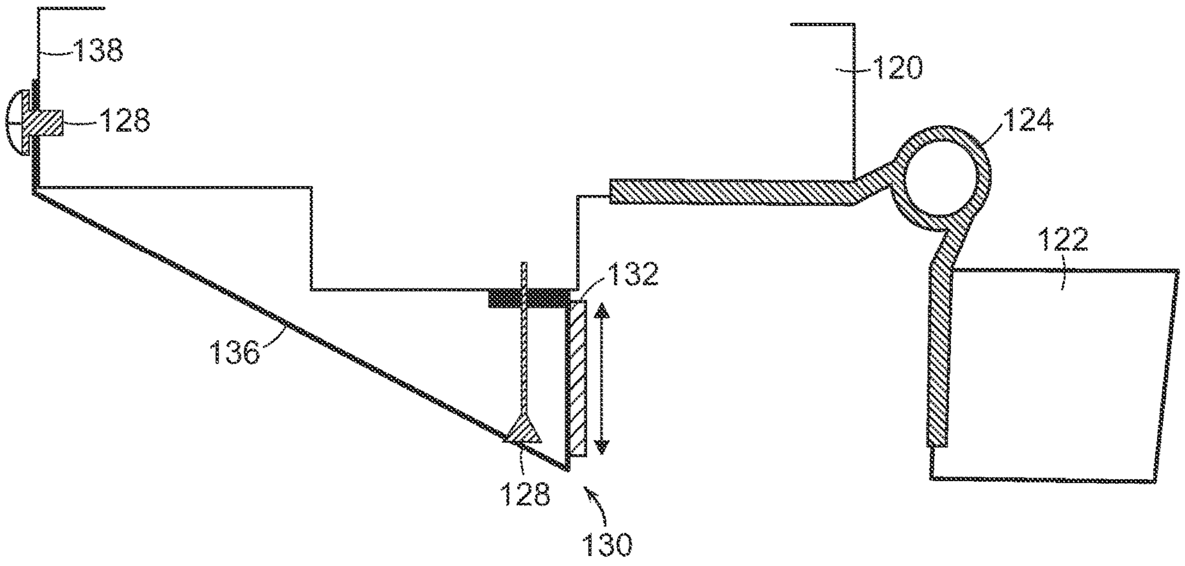
FIG. 15 shows an illustrative diagrammatic view of a door frame jamb with an edge saver in accordance with another embodiment of the present invention.

In particular, FIG. 14 shows a door frame jamb 120 (from above) and a door 122 that is attached to the door frame jamb 120 by a hinge 124. The system also includes a sheet of metal 126 that is attached to the door frame jamb 120 by fasteners 128, and the sheet of metal 126 includes an extended region 130 that effectively extends the stop depth of the door frame and that includes intumescent material 132 on a portion of the extended region 130 that is closest to the door 122 when closed. The end of the sheet of metal 126 that is opposite the extended region 130 may be fastened to the door frame head 120 on the face of the door frame head as shown in FIG. 14. In other embodiments and with reference to FIG. 15, the sheet of metal 146 may be fastened to the door frame jamb 120 on a far side 148 of the door frame jamb 120. The remaining elements of the system of FIG. 15 are the same as those of FIG. 14, and each may provide an increase in stop depth of about 2⅝ inch to 2⅞ inch.

Figure 16:
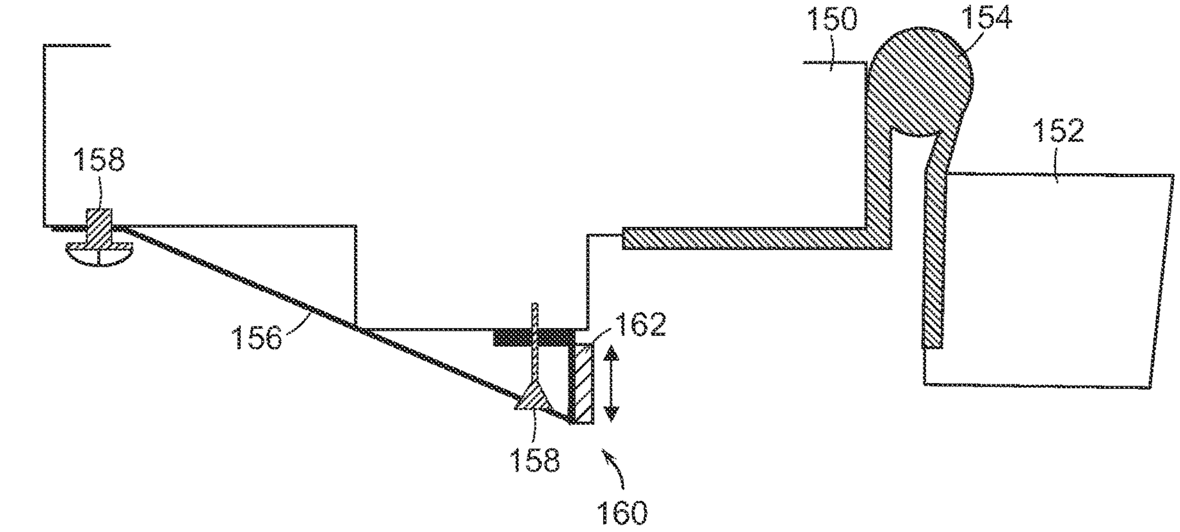
FIG. 16 shows an illustrative diagrammatic view of a swing clear in a door frame jamb in accordance with an embodiment of the present invention.
Figure 17:
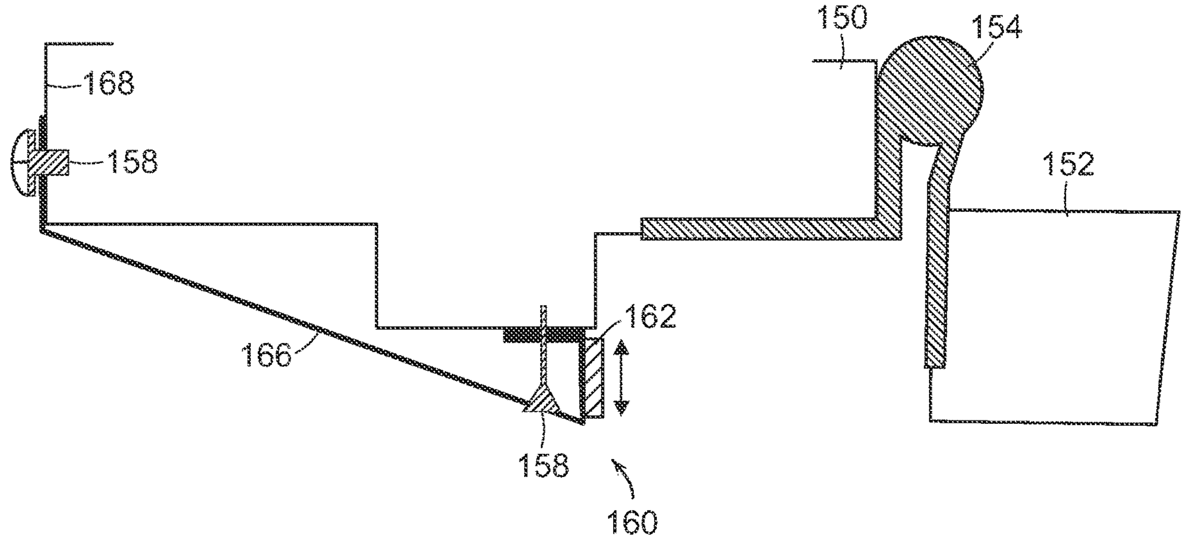
FIG. 17 shows an illustrative diagrammatic view of a swing clear hinge in a door frame jamb in accordance with another embodiment of the present invention.

Systems of the invention may also be used with Swing Clear hinge door frame assemblies as well to increase stop depth and provide intumescent material in particular, FIG. 16 shows a door frame jamb 150 (from above) and a door 152 that is attached to the door frame jamb 150 by a hinge 154. The system also includes a sheet of metal 156 that is attached to the door frame jamb 150 by fasteners 158, and the sheet of metal 156 includes an extended region 160 that effectively extends the stop depth of the door frame and that includes intumescent material 162 on a portion of the extended region 130 that is closest to the door 152 when closed. The end of the sheet of metal 156 that is opposite the extended region 160 may be fastened to the door frame jamb 150 on the face of the door frame head as shown in FIG. 16. In other embodiments and with reference to FIG. 17, the sheet of metal 166 may be fastened to the door frame head 150 on a far side 168 of the door frame jamb 150. The remaining elements of the system of FIG. 15 are the same as those of FIG. 16, and each may provide an increase in stop depth of about ⅝ inch.

Figure 18:
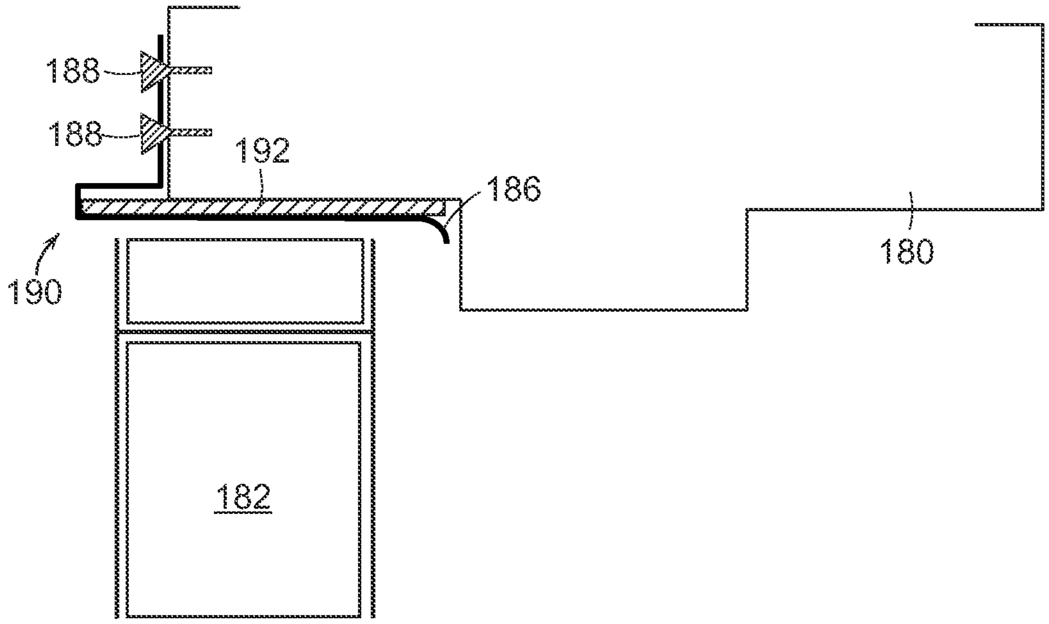
FIG. 18 shows an illustrative diagrammatic view of a door frame with a rabbet extender in accordance with an embodiment of the present invention.

In accordance with a further embodiment, system of the invention may be used to provide a rabbet extension as follow, FIG. 18 shows a door frame head 180 (from a side view) and a door 182 that is attached to the door frame head 180 by a hinge. The system also includes a sheet of metal 186 that is attached to the door frame head 180 by fasteners 188, and the sheet of metal 186 includes an extended region 190 that effectively extends the rabbet of the door frame and that includes intumescent material 192 on a portion of the extended region 190 that is closest to the door 182 when closed. Such a system may be effective where the door does not remain in a 1 15/16 inch rabbet as required by NFPA 80. The applied rabbet extender increases the depth of the rabbet so that the frame does not need to be removed and realigned to keep the door in the rabbet. The system may be installed on the door head or the hinge jam, and if used on the hinge jamb, the sheet of metal 186 and intumescent material 192 shall be prepared to accommodate the lock strike as needed.

Figure 19:
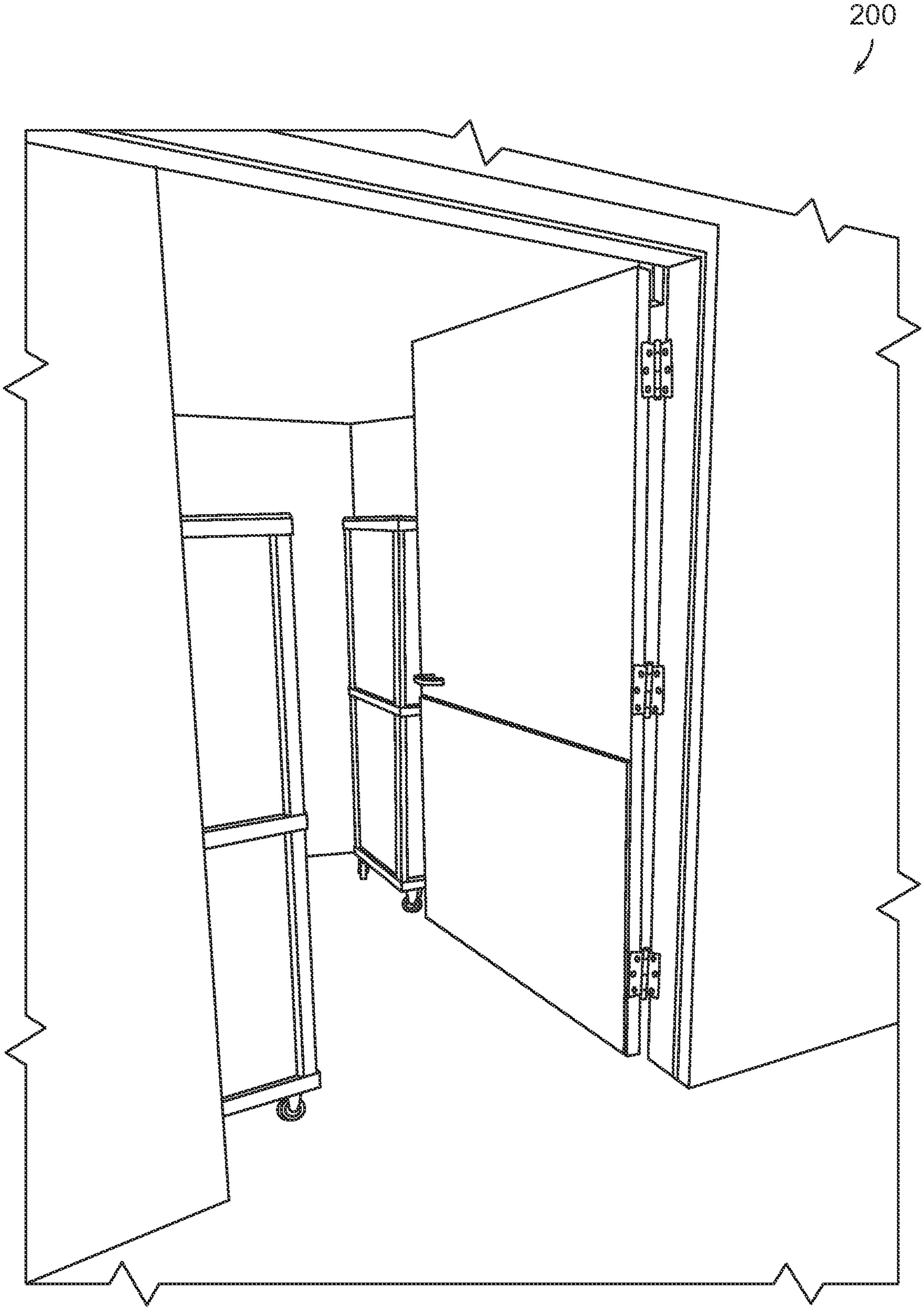
FIG. 19 shows an illustrative diagrammatic view of a door assembly in which an edge saver installation would prevent damage in accordance with an embodiment of the present invention.
Figure 20:
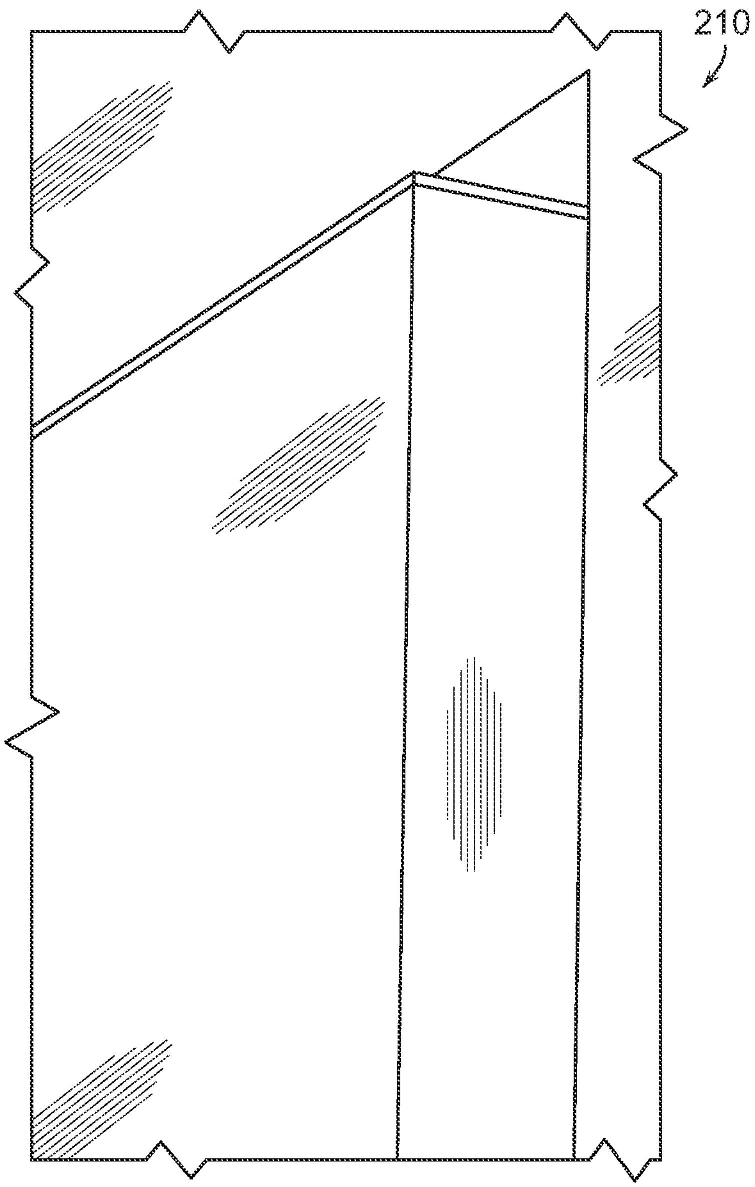
FIG. 20 shows an illustrative diagrammatic view of a portion of a door and frame requiring a rabbet extender in accordance with embodiment of the present invention.

FIG. 19 shows at 200 a typical door and frame assembly where the edge saver installation would keep carts from hitting edges of doors when passing through the opening. FIG. 20 shows at 210 a close up view of a portion of a door and frame assembly requiring a rabbet extender on both a head and a latch jam.

Figure 21:
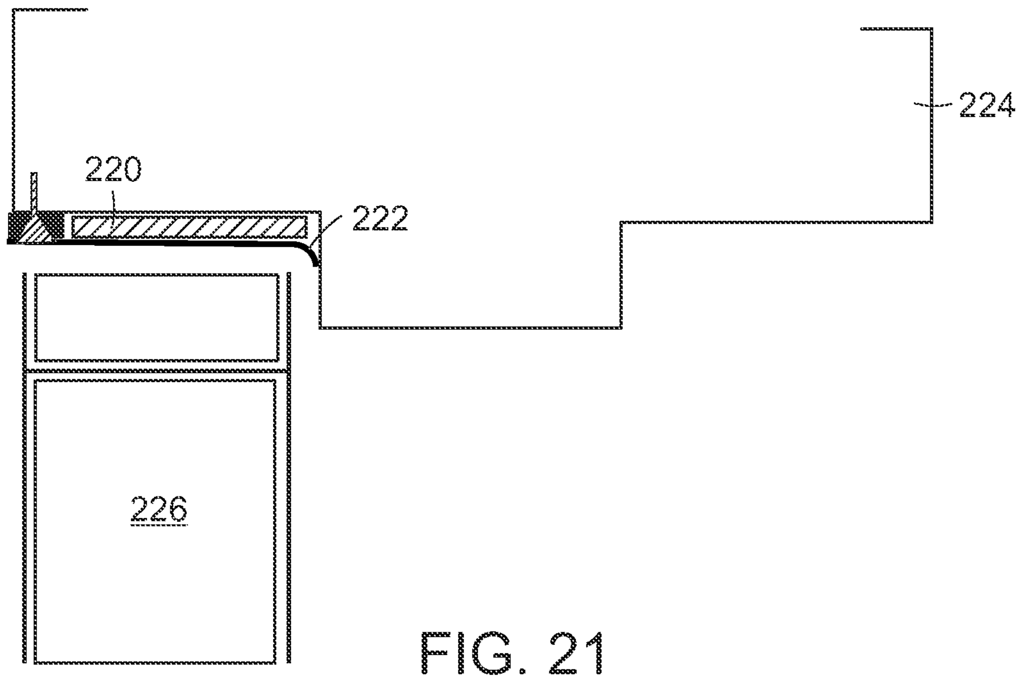
FIG. 21 shows an illustrative diagrammatic view of a door frame seal with an alternate mechanical design in accordance with an embodiment of the present invention.
Figure 22:
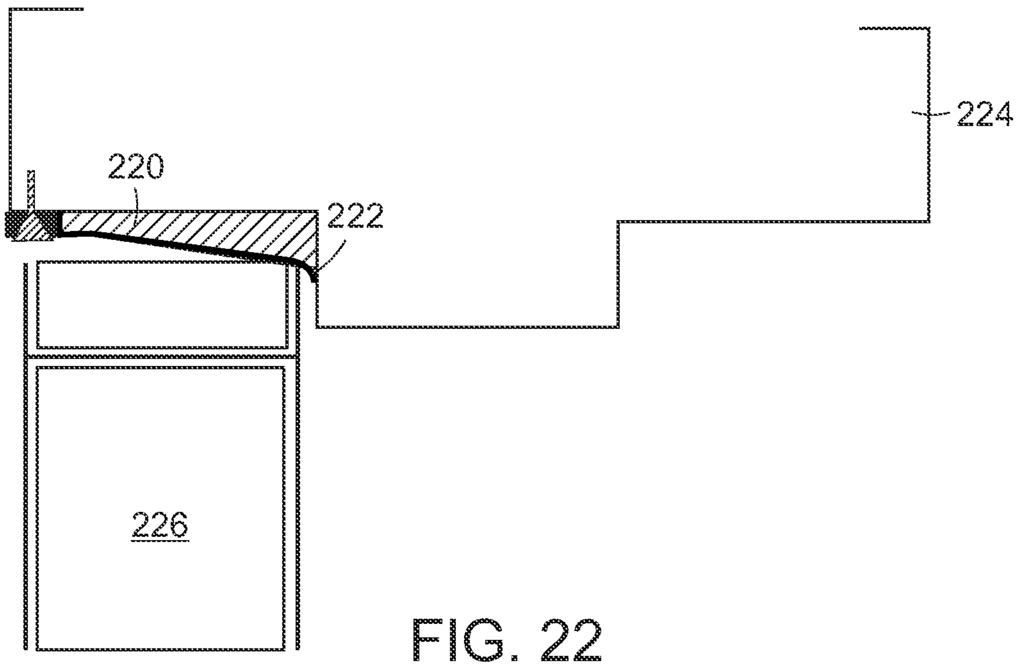
FIG. 22 shows an illustrative diagrammatic view of the door frame seal of FIG. 21 in a post fire/flame state.

FIG. 21 shows an alternate mechanical fastening design for frame seals similar to those of FIGS. 1 and 3. The intumescent material 220 is provided on a metal strip 222 that is provided on the rabbet surface only of the door frame head 224. As further shown in FIG. 22, when the intumescent material 220 swells, the door 226 is sealed against the door frame head 224.

Figure 23:
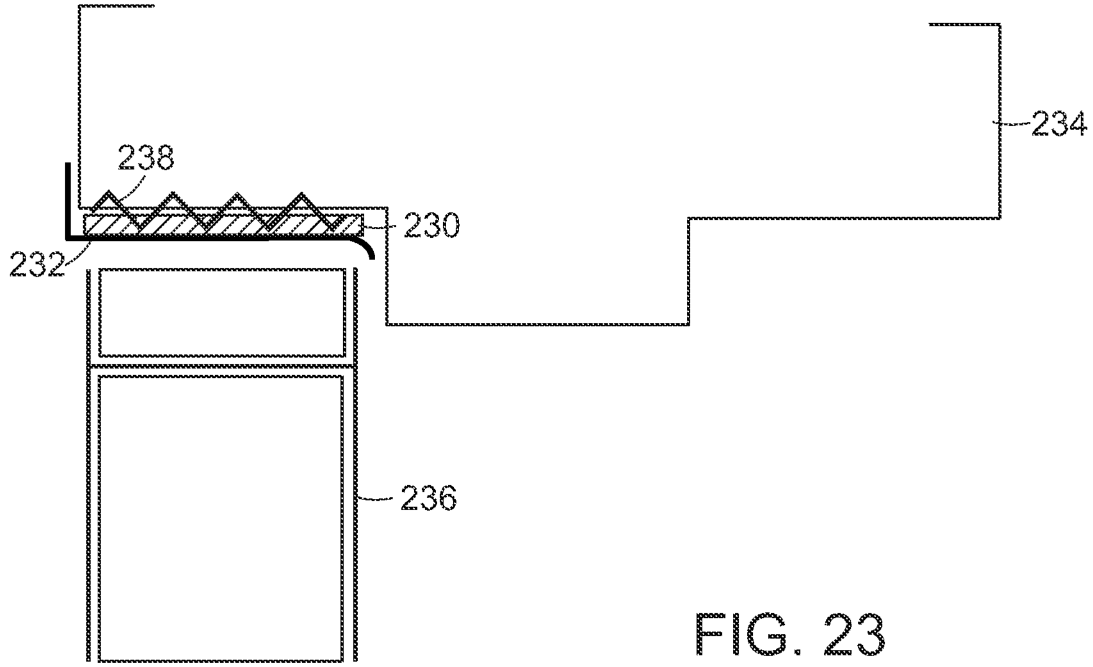
FIG. 23 shows an illustrative diagrammatic view of a door frame jamb with an alternate adhesive fastening design in accordance with an embodiment of the present invention.
Figure 24:
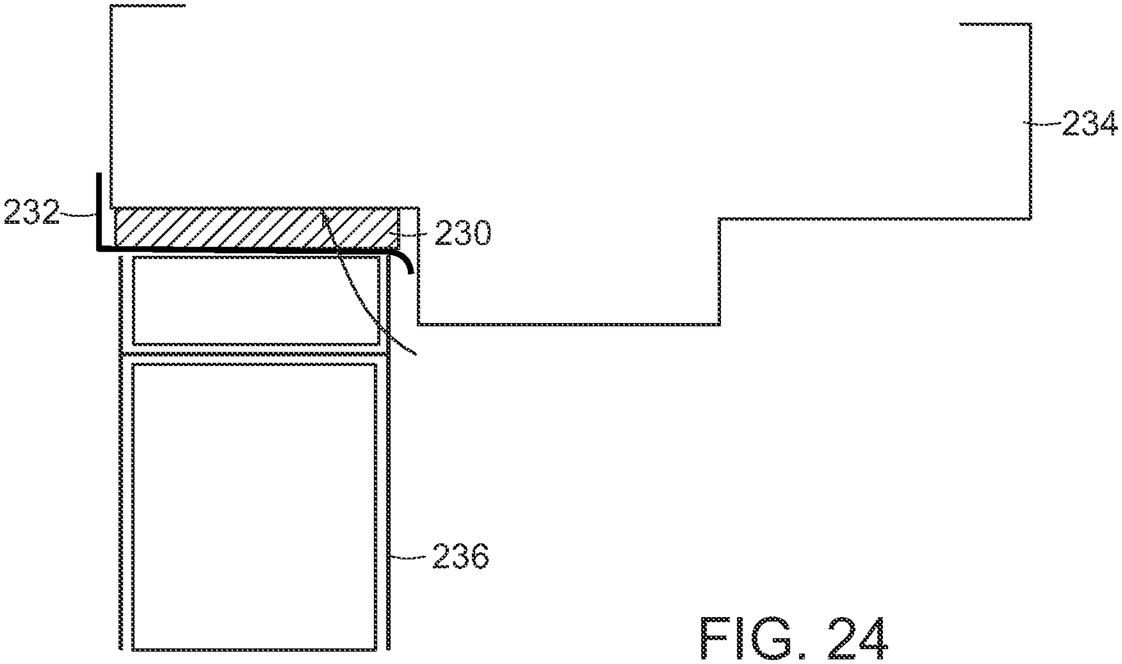
FIG. 24 shows an illustrative diagrammatic view of the door frame seal of FIG. 23 in a post fire/flame state.

FIG. 23 shows an alternate mechanical fastening design for frame seals similar to those of FIGS. 1 and 3 that involves the use of an adhesive. The intumescent material 230 is provided on a metal strip 232 that is held against the rabbet surface of the door frame head 234 using an adhesive 238. As further shown in FIG. 24, when the intumescent material 230 swells, the door 236 is sealed against the door frame head 234, and the adhesive has been released from the heat of the flames.

Figure 25:
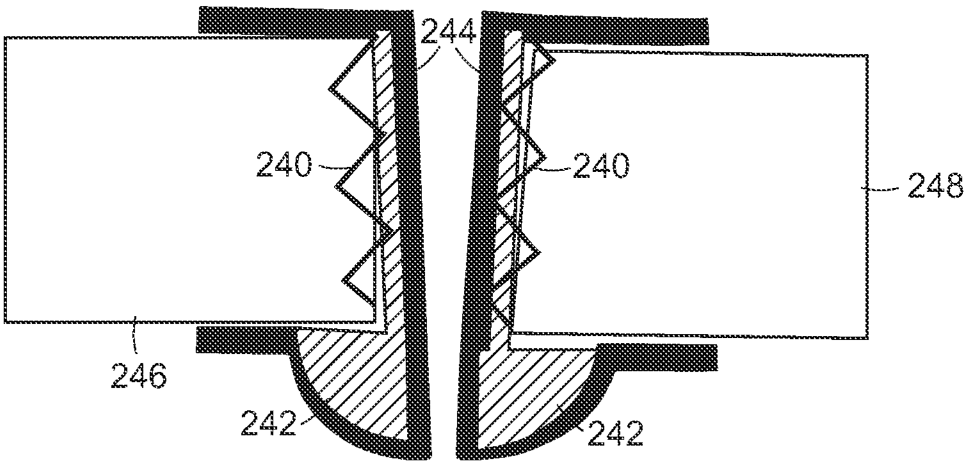
FIG. 25 shows an illustrative diagrammatic view of a sealed pair of door edges using adhesive in accordance with an embodiment of the present invention.
Figure 26:
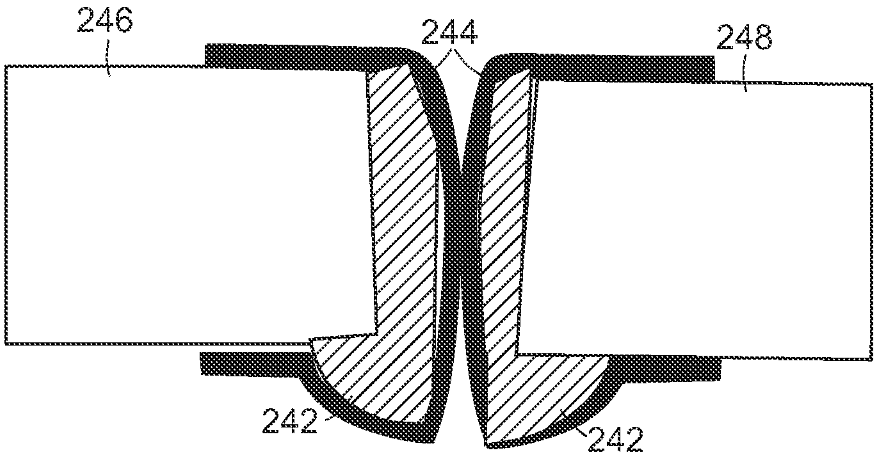
FIG. 26 shows an illustrative diagrammatic view of the sealed pair of door edges of FIG. 25 in a post fire/flame state.

FIG. 25 shows an alternate design that uses adhesive at a pair of door edges. In particular, adhesive 240 is used to hold an intumescent material 242 and a metal strip 244 against each door 246, 248. Similar to the system of FIG. 7, the metal strip 244 includes an expandable portion as shown. When exposed to the high heat and fire and with reference to FIG. 26, the intumescent material 242 swells, sealing the pair of doors 246, 248.

Figure 27:
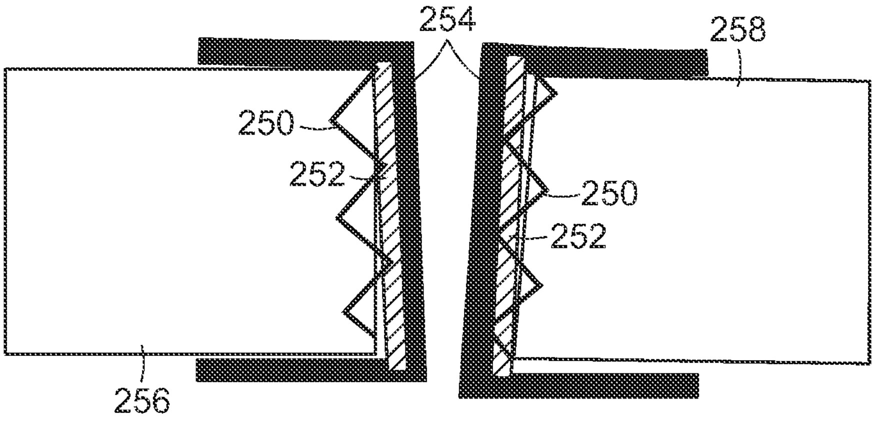
FIG. 27 shows an illustrative diagrammatic view of a sealed pair of door edges using adhesive in accordance with a further embodiment of the present invention.
Figure 28:
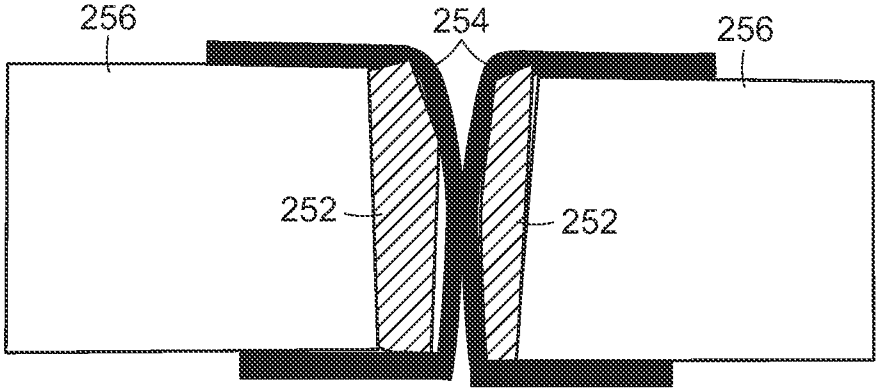
FIG. 28 shows an illustrative diagrammatic view of the sealed pair of door edges of FIG. 27 in a post fire/flame state.

FIG. 27 shows an alternate design that uses adhesive at a pair of door edges. In particular, adhesive 250 is used to hold an intumescent material 252 and a metal strip 254 against each door 256, 258. When exposed to the high heat and fire and with reference to FIG. 28, the intumescent material 252 swells, the adhesive is released, and the metal strips are urged together, sealing the pair of doors 246, 248.

Figure 29:
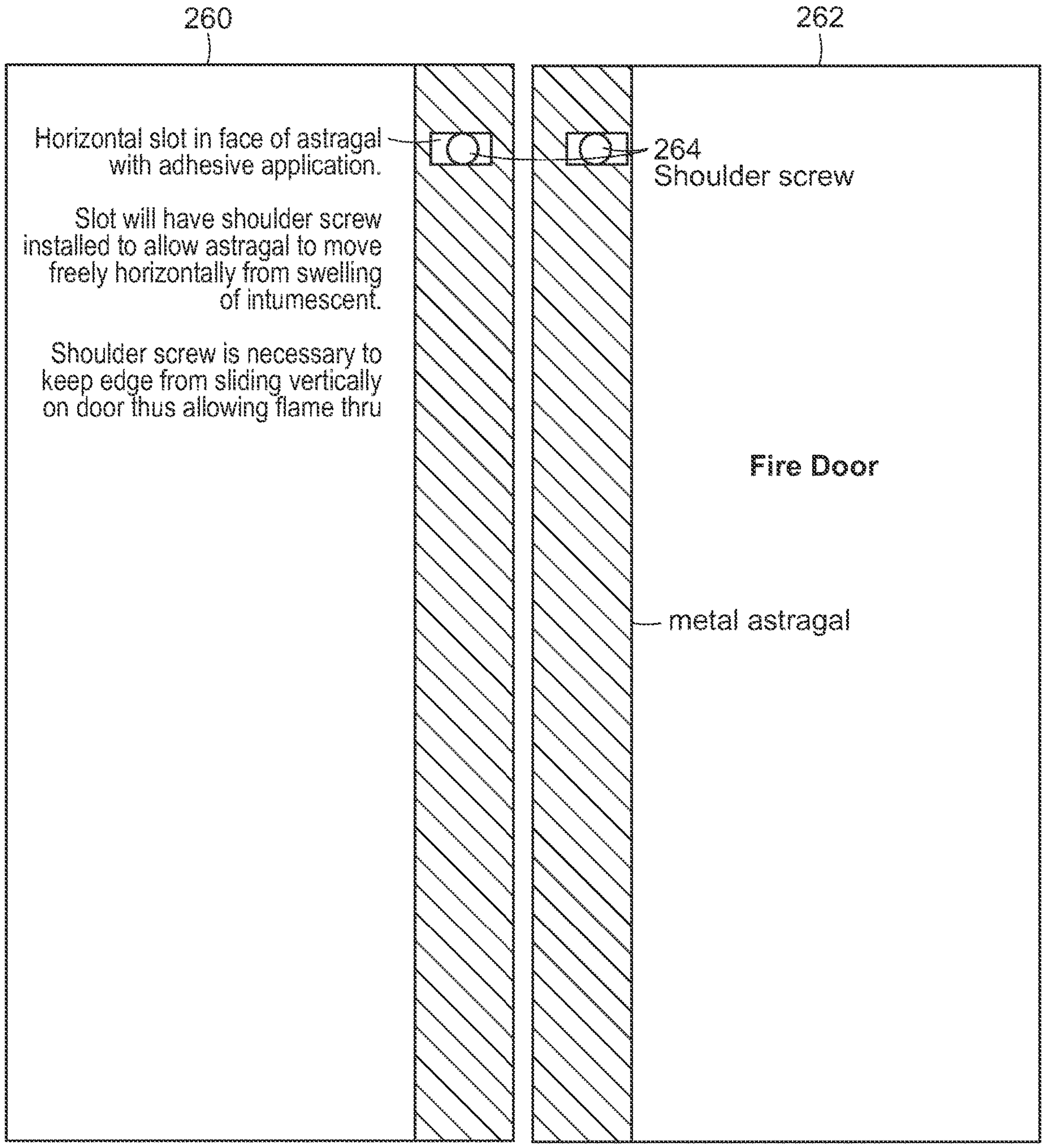
FIG. 29 shows an illustrative diagrammatic side view of a pair of doors using an adhesive application in accordance with an embodiment of the present invention.

FIG. 29 shows a side view of a pair of doors 260, 262 that use an adhesive application as discussed in above in connection with FIGS. 25-28. As shown in FIG. 29, shoulder screw 264 is used on each door allow the metal strip to move when the intumescent material swells, but to keep the metal strip (astragal) from sliding vertically (downward).

Those skilled in the art will appreciate that numerous modifications and variations may be made to the above disclosed embodiments without departing from the spirit and scope of the present invention.

What is claimed is:

1. A system for modifying a fire door clearance, comprising:
- a non-flammable metal strip configured to wrap around an edge of a door; and
- an intumescent material applied to an inner portion of the non-flammable metal strip such that the intumescent material is sandwiched between the non-flammable metal strip and the edge of the door wherein the non-flammable metal strip is fastened to the door with an adhesive and a mechanical fastener in the door that engages a slot in the non-flammable metal strip,
- wherein the non-flammable metal strip slides away from the edge of the door in response to an expansion of the intumescent material to seal a clearance between the edge of the door and an adjacent structure, wherein the mechanical fastener in the door engaging the slot in the non-flammable metal strip guides the non-flammable metal strip such that the non-flammable metal strip slides away from the edge of the door in a first predetermined direction Rwhenlland is prevented from sliding in a second predetermined direction in response to the expansion of the intumescent material.

2. The system as recited in claim 1, wherein the non-flammable metal strip is configured to wrap around a side edge of the door.

3. The system as recited in claim 2, wherein the non-flammable metal strip slides away from the side edge of the door to seal the clearance between the side edge of the door and a side edge of an adjacent door in response to the expansion of the intumescent material.

4. The system as recited in claim 1, wherein the non-flammable metal strip is configured to wrap around a bottom edge of a door.

5. The system as recited in claim 4, wherein the non-flammable metal strip slides away from the bottom edge of the door to seal the clearance under the bottom edge of the door in response to the expansion of the intumescent material.

6. The system as recited in claim 1, wherein the mechanical fastener is a shoulder screw.

7. The system as recited in claim 1, wherein the first predetermined direction is a horizontal direction.

8. The system as recited in claim 1, wherein the adhesive releases the non-flammable metal strip allowing the metal strip to slide away from the edge of the door in response to the intumescent material expanding against the metal strip.

9. The method as recited in claim 1, wherein the second predetermined direction is a vertical direction.

10. A method for modifying a fire door clearance, comprising:

fastening a non-flammable metal strip to a door with an adhesive and a mechanical fastener in the door that engages a slot in the metal strip, wherein the non-flammable metal strip wraps around an edge of the door and an intumescent material is sandwiched between the non-flammable metal strip and the edge of the door; and sliding the non-flammable metal strip away from the edge of the door in response to an expansion of the intumescent material to seal a clearance between the edge of the door and an adjacent structure, wherein the mechanical fastener in the door engaging the slot in the non-flammable metal strip guides the non-flammable metal strip such that the non-flammable metal strip slides away from the edge of the door in a first predetermined direction and is prevented from sliding in a second predetermined direction in response to the expansion of the intumescent material.

11. The method as recited in claim 10, wherein the edge of the door is a side edge of the door.

12. The method as recited in claim 11, wherein the non-flammable metal strip slides away from the side edge of the door to seal the clearance between the side edge of the door and a side edge of an adjacent door in response to the expansion of the intumescent material.

13. The method as recited in claim 10, wherein the edge of the door is a bottom edge of the door.

14. The method as recited in claim 13, wherein the non-flammable metal strip slides away from the bottom edge of the door to seal the clearance under the bottom edge of the door in response to the expansion of the intumescent material.

15. The method as recited in claim 10, wherein the mechanical fastener is a shoulder screw.

16. The method as recited in claim 10, wherein the first predetermined direction is a horizontal direction.

17. The system as recited in claim 10, wherein the adhesive releases the non-flammable metal strip allowing the metal strip to slide away from the edge of the door in response to the intumescent material expanding against the metal strip.

18. The method as recited in claim 10, wherein the second predetermined direction is a vertical direction.

* * * * *